United States Patent Office 3,496,009
Patented Feb. 17, 1970

---

3,496,009
PROCESS FOR DYEING GLASS FIBERS
Mario Hilbert, Cologne, Mulheim, and Klaus Damm and Karl Schnurrbusch, Cologne-Flittard, Germany, assignors to Farbenfabriken Bayer Aktiengesellschaft, Leverkusen, Germany, a corporation of Germany
No Drawing. Continuation of application Ser. No. 224,535, Sept. 18, 1962. This application Nov. 20, 1967, Ser. No. 684,564
Claims priority, application Germany, Sept. 28, 1961, F 35,023
Int. Cl. C03c *25/02*
U.S. Cl. 117—62.2                 8 Claims

ABSTRACT OF THE DISCLOSURE

A composition useful for promoting fastness of pigments to binder-treated glass fibers, said composition containing an $\alpha,\omega$-dihydroxy derivative of a polyorganosiloxane of the formula

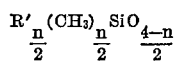

wherein $n$ is a number of 1.9–2.1 and R' is a hydrogen atom or hydrocarbon, with an organic solvent or emulsifier; and a process for dyeing glass fibers with pigments and pigment binders by initially drying the binder-treated fibers without effecting substantial crosslinking; and thereafter treating the fibers and binder with an active amount of an $\alpha,\omega$-dihydroxy derivative of the polyorganosiloxane, and thereafter finally heating to effect crosslinkage of the binder and applied polyorganosiloxane.

---

This is a continuation application of U.S. Ser. No. 224,535, filed Sept. 18, 1962, and now abandoned, and relates to a process for dyeing fabrics of glass fibers by means of pigments and binders.

Decorations of glass fiber fabrics are obtaining increasing importance as substitutes for fabrics from organic fibers, for purposes where absolute non-inflammability is required on the grounds of safety. The dyeing of these fabrics entails considerable difficulties, however, since the hitherto known dyestuffs do not draw substantively onto glass fiber. For this reason pigment-binder-dye processes were employed in which the dyestuff is fixed on the glass fiber with the aid of a binder based on synthetic resins and/or polymerizates or copolymerizates. When the binding agent compositions customary in textile dyeing are employed, the strongly dyed fabrics in particular, apparently as a result of poor adhesion of the binder to the glass fiber, possess an insufficient fastness to rubbing and washing.

It has been further proposed to after-treat glass fiber fabrics dyed with polyacrylic acid esters as dye binders with compounds having a hydrophobing effect, e.g., with polysiloxane fluids (cf. U.S. Patent 2,868,668). In this connection, however, neither the particular silicones recommended, nor details as to operating conditions are provided.

In accordance with the present invention it has been found that the fastness of dyeing on glass fibers, especially the fastness to wetting and to rubbing of dyeings which have been produced by employing pigments and binders usual for dyeing and based on polymerizates of monomeric polymerizable compounds containing vinyl groups, can be decidedly improved by an after-treatment with certain specific silicones under predetermined operating conditions. The resulting improvement in fastness is of especial importance in jobs involving the production of dyeings in deep shades.

The process of the present invention relates to glass fibers, especially glass fiber fabrics, which have been dyed in the usual way (i.e. with pigments and pigment binders). The binders are preferably based on copolymerizates of compounds containing vinyl groups, optionally in the presence of other, preferably self-cross-linking binders such as amido-formaldehyde condensates and the like. The fibers in question are treated, without intermediate cross-linking (hardening) of the binder film, with an $\alpha,\omega$-dihydroxy polyorgano siloxane of the compound of the formula

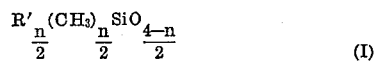

wherein $n$ is a number from 1.9 to 2.1, and R' represents hydrogen or a hydrocarbon radical or with mixtures of (I) with up to 60%, calculated on the weight of (I), of an organo polysiloxane of the formula

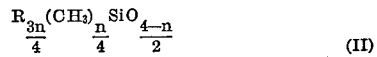

wherein $n$ is a number of from 0.5 to 1.5 and R represents a hydrocarbon radical, if desired, together with hardening catalysts usual for siloxanes, and then heating the so-treated material at 100 to 200° C., preferably at 100 to 170° C. In the final heating the above binders crosslink with the siloxanes to form an extremely wet-fast and rubbing-fast film on the glass fiber.

The above siloxanes (I) to be used according to the invention are produced in the usual way by hydrolysis of the corresponding chlorosilane or by alkaline or acid polymerization from the cyclic siloxane. The viscosity can vary within wide limits according to the type of starting components and the production process.

The siloxanes above identified as (II) are produced in the usual way by cohydrolysis of the organo chlorosilane R''$_m$SiCl$_{4-m}$, where R'' is methyl or another hydrocarbon radical and $m$ is a number 0, 1, 2 or 3.

The siloxane mixtures are hardened at temperatures of 100–200° C., preferably 100–170° C., at which also the dye binders cross-link.

The application of the hardening catalysts usual for siloxanes is possible. Suitable are inter alia metal salts, organo-metal compounds, amines or ammonium salts or peroxides. For example, lead, cobalt, zinc, and tin salts of higher carboxylic acids, zirconium acetate, chromacetyl acetonate, dibutyl tin dilaurate, dioctyl tin dimaleate, butylamine, dibutylamine, choline octoate, and tetramethyl ammonium acetate, are used.

The described siloxanes can be employed undiluted, as solutions in organic solvents, e.g. hydrocarbons or chlorohydrocarbons, or preferably as emulsions. For the production of the emulsions, however, emulsifiers usual for siloxane emulsions are used. Suitable examples are morpholine oleate, polyvinyl alcohol, polyethylene glycol derivatives of nonyl phenol and higher saturated or unsaturated alcohols.

The carrying out of the above process depends on the manner of operation usual for pigment-binder-dye processes. It is expedient for instance to apply the dyebath onto the generally precleaned glass fibre fabric by means of a foulard. In the first working stage the fabric is dyed. For this purpose the pigment binders based on copolymerizates of compounds containing vinyl groups, usual in textile dyeing, are suitable especially those which have been described in German Auslegeschrift 1,122,037; 1,131,182; 1,011,850 and 1,047,431 and the Belgian patent specification 579,381. The choice of binder is not restricted, however, to the combinations disclosed herein. In general copolymerizates may be applied, for the production of which there can be employed as vinyl monomer, for example: acrylic acid, methacrylic acid, as well as their esters, with lower aliphatic alcohols such as methanol or ethanol, acrylonitrile, acrylamide, and methacrylamide, as well as their alkylol lower alkyl ethers, especially the methyl and ethyl ethers, styrene, butadiene, vinyl chloride, vinylidene chloride etc.

As pigments, any of the usual inorganic or organic pigments usual in textile dyeing can be applied, e.g. metal powders, $TiO_2$, chrome oxides, carbon black, zinc and iron oxide, the known vat and phthalocyanine pigments as well as azo pigment dyestuffs or lake-forming basic dyestuffs. (cf. Colour Index 2nd edition vol. 3; Azoic dyes prepared from azoic diazo and azoic coupling components No. 37,000–37,625.)

In many cases it is advantageous to add to the dye bath a conventional synthetic resin precondensate. Melamine- or urea-, ethylene-urea-, N-alkylurea-, guanidine- and dicyandiamide-formaldehyde resins and the so-called "reactant-type" resins, e.g. based on ethylene-urea or epoxides, behave especially favourably. The simultaneous application of these resins frequently results in a further improvement of the rubbing and washing-fastnesses of the dyeings. Similarly, triethylene imine phosphine oxide polymerization products can be added to the binding agent in a manner analogous to the process of German patent specification 1,044,761.

The glass fibre fabric is impregnated with the cold dyebath for example, on the foulard, and thereafter dried for removal of the moisture. The binder concentrations to be used follow the instructions appropriate to each individual process made by the producers of the pigment binders. The fluid take-up is determined by the pressure at the foulard.

In connection with the dyeing it is expedient to have an intermediate drying, without cross-linking of the binder taking place, i.e. at temperatures of about 50 to 90° C. The glass fibre materials are then impregnated, preferably likewise on a foulard, e.g. with an aqueous bath which contains the aforesaid siloxane components, optionally together with suitable hardening agents. The concentration depends on the desired fastness requirements in each case. Finally the fabrics are dried in the usual drying plant and hardened out at temperatures of 100 to 200° C., preferably 100 to 170° C.

The process according to the invention makes possible the production of dyed glass fibre fabrics, which are distinguished by outstanding fastness properties, especially very good fastness to wetting and rubbing, as well as good solvent fastness of the dyeings.

The following examples are given for the purpose of illustrating the invention.

EXAMPLE 1

A dyebath of the following composition is made up:

Dyebath 1

35 parts of an aqueous pigment paste of tetraphenyl copper phthalocyanine (Colour Index 1956, vol. 3, No. 74,280) 80 parts of Binder A, according to German Auslegeschrift 1,011,850, Example 7, based on an emulsion copolymerizate of 50% acrylic acid butyl ester, 35% styrene, 10% acrylonitrile, and 5% methyl ether of methacrylmethylolamide;

4 parts of 60% acetic acid;
5 parts of ammonium chloride or ammonium sulphate;
70 parts of synthetic resin precondensate from melamine and formaldehyde;
806 parts of water;

1000 parts

A commercial glass fibre fabric with about 250 g./m.² weight is precleaned with wetting agents and then dried. The fabric is then impregnated in the given dyebath, cold, on the foulard, and then dried at 70–90° C. The impregnated fabric is after-treated with the following siloxane emulsion on the foulard:

Siloxane emulsion 1

3.3 parts α,ω-dihydroxypolydimethylsiloxane with viscosity 20,000 centistoke at 20° C. of the approximate formula

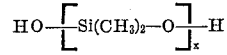

(the degree of polymerization $x$ corresponds to the viscosity of about 20,000 centistoke);

0.7 part α,ω-trimethylsiloxypolymethylhydrogen siloxane of viscosity 60 centistoke at 20° C.;
4.0 parts of toluene;
3.0 parts of basic zirconium acetate;
0.5 part morpholine oleate;
88.5 parts water;

The fabric dried with dyebath 1 is impregnated in the same way as in the dyeing, cold, on the foulard, and then dried for 3 to 4 minutes at 170° C. Hardening of the binder and of the siloxane takes place at the same time. A green dyeing is obtained with good wet- and rubbing-fastness.

The α,ω-dihydroxypolydimethylsiloxane was produced in known manner by polymerization of octamethylcyclotetrasiloxane with 0.01% KOH at about 130° C. The viscosity amounts to 20,000 centistoke at 20° C.

By co-hydrolysis of 94 parts by weight of methyl hydrogendichlorosilane and 6 parts by weight of trimethylmonochlorosilane in water, there was likewise produced in known manner an oil of 60 centistoke viscosity at 20° C. The two siloxanes were dissolved in toluene in the mixing ratio given above. The remaining substances of the emulsion were dissolved in water and an emulsion was produced in a conventional emulsifying machine.

For better emulsion stability a further 0.3% finely dispersed silicic acid can be added.

EXAMPLE 2

According to the manner of operation of Example 1, glass fibre fabrics are treated with the dyebath 2 described in the following, and then with the siloxane emulsion 2:

Dyebath 2

20 parts of aqueous pigment paste of a yellow disazo dyestuff, obtained by coupling 2 mol of diazotized 4-chloro-2-toluidine and 1 mol of N,N-diacetoacetyl-o-toluidine,
60 parts of binder B, according to German patent specification 1,011,850, Example 5, based on an emulsion copolymerisate of 50% of acrylic acid butyl ester, 25% acrylonitrile, 20% styrene, and 5% of the methylol ether from monododecyl ester of maleic acid amide
4 parts of 60% acetic acid;
5 parts of ammonium chloride;
911 parts of water;

1000 parts

Siloxane emulsion 2

3.0 parts of methyl siloxane resin solution (50% in toluene)
6.0 parts of α,ω-dihydroxypolydimethylsiloxane with 3,000 centistoke viscosity at 20° C.;
1.5 parts of α,ω-trimethylsiloxypolymethyl hydrogen siloxane of viscosity 60 centistoke at 20° C.;
7.5 parts of toluene;
1.0 part of polyvinyl alcohol;
0.5 part of dibutyl tin dilaurate;
80.5 parts of water.

After the hardening performed in connection with the drying, at 140–170° C. for 4 to 6 minutes, a fast yellow dyeing is obtained.

In the same way as described in Example 1, from octamethylcyclotetrasiloxane, an α,ω-dihydroxypolydimethyl siloxane was produced with a viscosity of 3,000 centistokes.

For the siloxane emulsion the following methylpolysiloxane resin was employed: by co-hydrolysis of 90 parts by weight of methyltrichlorosilane and 10 parts by weight of dimethyldichlorosilane in the presence of the same quantity of solvent, e.g. toluene, a siloxane resin solution was produced in the approximately fourfold amount of water. This resin dries in a thin layer at temperatures of 100–150° C. even without catalyst.

The emulsion was produced as described in Example 1. It was then adjusted to a pH between 3 and 5 by addition of 1.0 part of maleic acid. By this measure the stability of the emulsion is raised, since in the acid pH range it is known that hydrolysis of the SiH groups is precluded.

EXAMPLE 3

In a method of operation analogous to that described in Example 1, the following dyebaths and siloxane emulsions were used:

Dyebath 3

- 30 parts of aqueous green pigment paste of "Heliogen Green G" (Colour Index 1956, vol. III, No. 74280)
- 70 parts of Binder C, according to German patent specification 1,011,850, Example 6, based on an emulsion co-polymerizate of 30% of butadiene, 20% of acrylic acid butyl ester, 45% of styrene and 5% of the methylol ether of methacrylamide;
- 4 parts of 60% acetic acid;
- 5 parts of ammonimum chloride;
- 891 parts of water;

1000 parts.

Siloxane emulsion

- 9.0 parts of siloxane resin solution (50%)
- 6.0 parts of polydimethylsiloxane with viscosity of 20,000 centistoke at 20° C. according to Example 1;
- 2.0 parts of α,ω-trimethylsiloxypolymethyl hydrogen siloxane of viscosity 60 centistoke at 20° C. according to Example 1;
- 8.0 parts of toluene;
- 0.5 part of dibutyl tin dilaurate;
- 1.0 part of polyvinyl alcohol;
- 973.5 parts of water The fabric is dried at 50–90° C. and after subsequent hardening at 135–160° C. for 4 to 6 minutes a fast green dyeing is obtained.

For the siloxane emulsion the following siloxane resin was used: by co-hydrolysis of 1 mol each of methyltrichlorosilane, dimethyldichlorosilane, phenyltrichlorosilane and diphenyldichlorosilane in the presence of an equal quantity of solvent, e.g. toluene, a siloxane resin solution was produced in the approximately fourfold amount of water. The resin dries at temperatures of 100–150° C. in thin layers even without catalysts. The 50% resin solution was emulsified with an active amount of polyvinyl alcohol.

We claim:

1. In a process for dyeing glass fibers with pigments and pigment binders of copolymerizates of vinyl monomers, the improvement comprising impregnating the fibers with an aqueous dye bath containing pigment and pigment binder, said pigment binder consisting essentially of a self cross-linking copolymerizate of compounds containing vinyl groups; effecting drying of the impregnated fibers without cross-linking the pigment binder at a temperature of about 50–90° C.; applying to the fibers an active amoun of an α,ω-dihydroxy derivative of a polyorganosiloxane having the formula

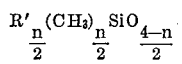

wherein: $n$ is a number of about 1.9–2.1; and R′ is a member selected from the group consisting of a hydrogen and hydrocarbon moiety; and thereafter affecting a final heating of the treated fibers at a temperature of about 100–200° C. to effect cross-linking of the binder and polyorganosiloxane.

2. The process of claim 1 in which the pigment binder is a copolymerizate prepared by copolymerizing at least two members taken from the class consisting of acrylic acid, methacrylic acid, acrylic acid lower alkyl esters, methacrylic lower alkyl esters, butadine, styrene, acrylonitrile, vinyl chloride, vinylidene chloride, acrylic acid amide alkyl methylol ethers, and methacrylic acid amide alkyl methylol ethers.

3. The process of claim 1 wherein the fibers impregnated with polyorgano siloxane are treated with a hardening catalyst for the polyorgano siloxane before heating to 100–200° C.

4. The process of claim 3 wherein the hardening catalyst for the polysiloxane is a member selected from the class consisting of a metal salt, organo-metal compound, amine, ammonium salt and peroxide.

5. The process of claim 1 wherein α,ω-polyorganosiloxane is applied to the fibers in admixture with 0.1 to 60% by weight of an organopoly siloxane of the formula

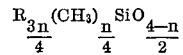

wherein $n$ is a number of about 0.6–1.5 and R is a hydrocarbon.

6. The process of claim 1 wherein the final heating step is carried out at a temperature of 100–170° C.

7. The process of claim 1 in which the polyorgano siloxane is utilized in emulsion form.

8. The process of claim 1 wherein the aqueous dye bath also contains a water-soluble amido formaldehyde condensate of the class consisting of urea formaldehyde, ethylene-urea formaldehyde, N-alkylurea formaldehyde, guanidine formaldehyde, dicyandiamide formaldehyde and melamine formaldehyde condensate.

References Cited

UNITED STATES PATENTS

| | | | |
|---|---|---|---|
| 3,070,566 | 12/1962 | Nitzsche et al. | 260—825 X |
| 3,127,363 | 3/1964 | Nitzsche et al. | 260—825 |
| 3,205,283 | 9/1965 | Modic | 260—825 |
| 3,061,567 | 10/1962 | Keil | 260—825 |

WILLIAM D. MARTIN, Primary Examiner

R. HUSACK, Assistant Examiner

U.S. Cl. X.R.

8—18, 8; 117—76, 126; 260—46.5